United States Patent
Hornung et al.

(10) Patent No.: US 11,440,795 B2
(45) Date of Patent: Sep. 13, 2022

(54) METHOD FOR THE DEHYDROGENATION OF ORGANIC MOLECULES

(71) Applicant: Fraunhofer-Gesellschaft Zur Forderung Der Angewandten Forschung, Munich (DE)

(72) Inventors: Andreas Hornung, Karlsruhue (DE); Clemens Schmetterer, Sulzbach-Rosenberg (DE); Daniela Dommel, Lichtenau (DE)

(73) Assignee: FRAUNHOFER-GESELLSCHAFT ZUR FORDERUNG DER ANGEWANDTEN FORSCHUNG E.V., Munich (DE)

( * ) Notice: Subject to any disclaimer, the term of this patent is extended or adjusted under 35 U.S.C. 154(b) by 711 days.

(21) Appl. No.: 16/319,778

(22) PCT Filed: Jul. 14, 2017

(86) PCT No.: PCT/EP2017/067816
§ 371 (c)(1),
(2) Date: Jan. 22, 2019

(87) PCT Pub. No.: WO2018/015286
PCT Pub. Date: Jan. 25, 2018

(65) Prior Publication Data
US 2021/0276861 A1    Sep. 9, 2021

(30) Foreign Application Priority Data
Jul. 22, 2016   (DE) .......................... 102016213455.8

(51) Int. Cl.
*C01B 3/00*    (2006.01)
*B01J 8/00*    (2006.01)
(Continued)

(52) U.S. Cl.
CPC .......... *C01B 3/0015* (2013.01); *B01J 8/0278* (2013.01); *B01J 8/085* (2013.01)

(58) Field of Classification Search
CPC ..... B01J 8/00; B01J 8/02; B01J 8/0278; B01J 8/08; B01J 8/085; B01J 8/18; B01J 8/24;
(Continued)

(56) References Cited

U.S. PATENT DOCUMENTS 5,563,314 A    10/1996   Agaskar et al.
6,315,972 B1 *  11/2001   Mehdizadeh .......... B01J 8/0285
                                                 204/157.46
(Continued)

FOREIGN PATENT DOCUMENTS

DE    10 2013 203892 A1    9/2014
DE    10 2013 214313 A1    1/2015
(Continued)

OTHER PUBLICATIONS

European Search Report dated Oct. 5, 2020.
(Continued)

*Primary Examiner* — Natasha E Young
(74) *Attorney, Agent, or Firm* — Tarolli, Sundheim, Covell & Tummino LLP

(57) ABSTRACT

A process for dehydrogenating organic molecules (OM) and a reaction vessel (RB) suitable for the process for dehydrogenating organic molecules by means of an inductive field (IF), wherein the reaction vessel comprises a device for generating an inductive field and a solid loose material (FLM), and wherein the reaction vessel and its contents are free of platinum, palladium, rhodium, gold, iridium, titanium, tantalum or ruthenium.

14 Claims, 8 Drawing Sheets

Figure 1:
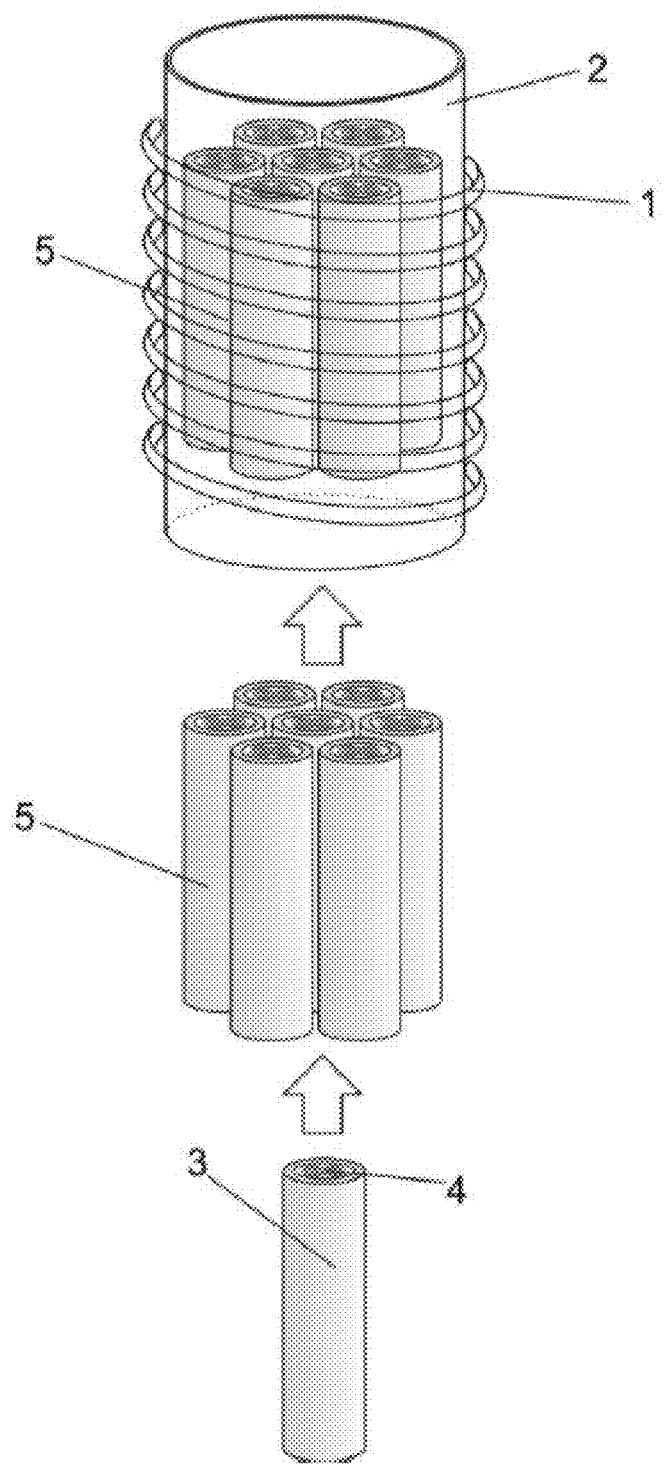

(51) Int. Cl.
- *B01J 8/02* (2006.01)
- *B01J 8/08* (2006.01)
- *B01J 8/18* (2006.01)
- *B01J 8/24* (2006.01)
- *B01J 8/42* (2006.01)
- *B01J 19/00* (2006.01)
- *B01J 19/24* (2006.01)

(58) Field of Classification Search
CPC .... B01J 8/42; B01J 19/00; B01J 19/24; C01B 3/00; C01B 3/0005; C01B 3/001; C01B 3/0015; C01B 3/02; C01B 3/22
See application file for complete search history.

(56) References Cited

U.S. PATENT DOCUMENTS

2012/0164034 A1   6/2012   Seo et al.
2016/0136610 A1*  5/2016   Wasserscheid ........ B01J 16/005
                                                           423/648.1

FOREIGN PATENT DOCUMENTS

| WO | WO-2015010820 A1 * | 1/2015 | ............ B01J 16/005 |
| WO | 2016/096744 A1 | 6/2016 | |
| WO | 2018/015286 A1 | 1/2018 | |

OTHER PUBLICATIONS

Bruckner, et al., "Evaluation of Industrially Applied Heat-Transfer Fluids as Liquid Organic Hydrogen Carrier Systems", ChemSusChem 2014, 7, 229-235.
Examination Report for German Application No. 10 2016 213 455.8, dated May 8, 2017.
Teichmann, et al., "A future energy supply based on Liquid Organic Hydrogen Carriers (LOHC)", Energy Environ. Sci., 2011, 4, 2767-2773.
Daniel Teichmann, "Konzeption und Bewertung einer nachhaltigen Enetgieversogung auf Basis Flussiger Wasserstofflager", Jul. 14, 2014.

* cited by examiner

METHOD FOR THE DEHYDROGENATION OF ORGANIC MOLECULES

RELATED APPLICATIONS

This application is a national stage application of International Application No. PCT/EP2017/067816, WO 2018/015286, filed on Jul. 14, 2017, which claims priority to German Patent Application No. DE 10 2016 213 455.8, filed on Jul. 22, 2016.

BACKGROUND OF THE INVENTION

Field of the Invention

The present application concerns a process for dehydrogenating organic molecules, a reaction vessel suitable for conducting the process among other uses, and the use of a specific material for dehydrogenation of organic molecules.

DESCRIPTION OF RELATED ART

The dehydrogenation of organic molecules, for example of C—C single bonds or C—C double bonds, is known in principle. Here, on the industrial scale in particular, solid catalysts are frequently used, meaning that these reactions take place on a surface. This surface has been coated with catalysts, for example catalytically active metals, for example platinum, palladium, rhodium and ruthenium.

As well as the dehydrogenation of organic molecules to intermediates/end products, dehydrogenation also plays a role in applications where hydrogen is being tested as an alternative to fossil fuel. Since, however, the storage and transport of liquefied hydrogen is associated with considerable risks, alternatives for hydrogen storage are desirable.

The storage of hydrogen in liquid hydrogen storage materials is one such alternative. For this purpose, a chemical substance that can take on a reversible low-energy and high-energy state is required. This takes place by catalytic hydrogenation and dehydrogenation of the substance. A substance that can be used advantageously for these reactions can thus serve as a hydrogen storage means (Teichmann, D., Arlt, W., Wasserscheid, P., Freymann, R.: A future energy supply based on Liquid Organic Hydrogen Carriers (LOHC); Energy & Environmental Science, Issue 8, 2011).

The LOHC systems known from the prior art are generally pairs of substances in which the low-energy substance A is a high-boiling functionalized aromatic compound which is hydrogenated in the energy charging operation. One example relates to the use of the N-ethylcarbazole/perhydro-N-ethylcarbazole substance pair, in which the energy charging can typically be conducted at around 140° C. and elevated pressures, and the energy discharging at temperatures between 230 and 250° C.

As well as this, polycyclic aromatic such as benzene, naphthalene, pyrenes, phenanthrene can be used as LOHCs. Structures such as fluorene, fluorenes having a ring of five carbon atoms, likewise promote the release of hydrogen at low temperatures.

Aromatics, such as benzene, toluene, terphenyl, benzyltoluene, dibenzyltoluene, biphenyl, naphthalene, quinoline, 2-methylquinoline, fluorene and carbazole, by virtue of their lower enthalpy of formation, enable the release of hydrogen from their respective hydrogenated analogs at relatively low temperatures. It is likewise possible, as well as benzene and carbazole, to use azaborin as LOHC. Azaborin already has its maximum conversion at a dehydrogenation temperature below 100° C. (Teichmann D., Konzeption and Bewertung einer nachhaltigen Energieversorgung auf Basis flüssiger Wasserstoffträger [Design and Assessment of a Sustainable Energy Supply Based on Liquid Hydrogen Carriers], Shaker Verlag, Aachen, 2015.)

The high-energy substance perhydro-N-ethylcarbazole in the system mentioned has a hydrogen capacity of around 6% by mass of hydrogen. Thus, the energy of 100 kg of perhydro-N-ethylcarbazole stored in the releasable hydrogen is sufficient to move a motor vehicle for about 500 km, with formation of almost exclusively water vapor as combustion product on board in the utilization of energy. Thus, the approach constitutes an alternative of industrial interest to other energy storage concepts for mobile applications.

A class which is likewise of interest for this application is that of heat carrier oils, for example dibenzyltoluene, which can be catalytically hydrogenated at temperatures of 80 to 260° C. and 10 to 50 bar. Substances of this kind are known from Brückner, N., Obesser, K., Bösmann, A., Teichmann, D., Arlt, W., Dungs, J. and Wasserscheid, P. (2014), Evaluation of Industrially Applied Heat-Transfer Fluids as Liquid Organic Hydrogen Carrier Systems. ChemSusChem, 7; 229-235. doi: 10.1002/cssc.201300426.

Liquid hydrogen carrier materials are catalytically dehydrogenated at temperatures above 260° C. The hydrogen released can be utilized energetically, for example, in a fuel cell or in an internal combustion engine. Alternatively, the hydrogen thus obtained can also be used as starting material in the chemical industry, for example ammonia synthesis, methanol production, hydrogenation of cooking oils, Fischer-Tropsch synthesis etc. If the hydrogen is released on board a vehicle, the hydrogen provided can be utilized directly to operate the vehicle. A problem with the catalytic dehydrogenation of liquid hydrogen carrier materials is energy-efficient and homogeneous heating of the catalysts, and the contacting of the catalysts with the reactants at a temperature optimal for the reaction.

For dehydrogenation, metal catalysts based on platinum, palladium, rhodium and ruthenium are typically used, as described, for example, in WO 2016/096744.

For comprehensive use of these applications, however, a simple and inexpensive process is desirable. Moreover, the process should have a high efficiency.

Consequently, the present invention provides a process for dehydrogenating organic molecules (OM), said process having the following steps:
  a) feeding the organic molecules (OM) into a reaction vessel (RB),
    where the reaction vessel
    i) has been provided with a device for generating an inductive field (IF); and
    ii) has a susceptor (S) for the inductive field (IF),
  b) applying an inductive field (IF) and allowing the inductive field (IF) to act on the susceptor (S) and the organic molecules (OM),
  c) removing the hydrogen from the reaction vessel (RB) during and/or after step b),
  d) removing the dehydrogenated organic molecules (DOM) from the reaction vessel (RB) during and/or after step b), for example during step c),
  wherein the susceptor (S) comprises or consists of an active susceptor (AS),
    the active susceptor (AS) is such that it can couple magnetically to the inductive field (IF) and
  the reaction vessel is such that
    the active susceptor (AS) can couple to the inductive field (IF), the susceptor (S) comes into contact with the organic molecules (OM) and the reaction vessel and its contents are free of platinum, palladium, rhodium, gold, iridium, titanium, tantalum and ruthenium.

It has been found that, surprisingly, elevated evolution of hydrogen occurs provided that the inductive field has been applied and the catalytically active metals such as platinum, palladium, rhodium, gold, iridium, titanium, tantalum and ruthenium that are typically used can be dispensed with. Moreover, it is possible to dispense with the complex structuring that is customary for these metals and the generation of a high specific surface area; all that is required is slight roughening of the surface. This considerably lowers the costs. In addition, it was possible to increase the efficiency.

BRIEF SUMMARY OF THE INVENTION

In the present invention, "catalytic material" means a material that does not comprise or consist of platinum, palladium, rhodium, gold, iridium, titanium, tantalum and ruthenium.

In the present application, "solid loose material" (FLM) means that the material is not connected to the reaction vessel (RB) but can move freely within the reaction vessel (RB) and has a solid state of matter.

In the present application, susceptor (S) means an apparatus comprising or consisting of an active susceptor (AS). The active susceptor (AS) can couple to the inductive field. As well as the active susceptor (AS), the susceptor (S) may comprise further materials, for example carrier materials.

The process of the present invention can be conducted continuously or batchwise. In a continuous process, organic molecules (OM) are fed continuously to the reaction vessel (RB), while hydrogen is simultaneously released and withdrawn from the reaction vessel (RB) together with the dehydrogenation organic molecules (DOM). In a batchwise process, organic molecules (OM) are fed to the reaction vessel (RB) and hydrogen is released, while no further organic molecules (OM) are fed to the reaction vessel (RB). In general, removal of the hydrogen during the batchwise process is necessary owing to the increasing pressure in the reactor. This can be effected, for example, by means of a customary pressure relief valve.

Reaction vessels (RB) that are inductively heatable are known in the prior art. Typically, the device for generating the inductive field (IF) is mounted on the outside of the reaction vessel and the shell of the reaction vessel (RB) consists of a material that interacts only slightly, if at all, with the inductive field (IF). In principle, the device for generating the inductive field (IF) may also be mounted on the inside, but this is not preferred.

The susceptor (S) is preferably a solid loose material (FLM) or a fixed susceptor (RS).

Examples of fixed susceptors (RS) are perforated plates, for example perforated plates mounted one on top of another in the form of a sieve rack; meshes, e.g. fiber meshes; grids, spirals, cylinders, honeycomb structures and metal wool.

The susceptor (RS) typically comprises or consists of a catalytic material (KM), or the fixed susceptor (RS) takes the form of a carrier for the catalytic material (KM). If the fixed susceptor (RS) takes the form of a carrier for the catalytic material (KM), the catalytic material (KM) is preferably present as a loose bed on the carrier. Perforated plates, for example, are particularly suitable for this purpose.

In the present application, "the fixed susceptor (RS) typically comprises or consists of a catalytic material (KM)" means that the catalytic material (KM) has been mounted on the fixed susceptor (RS) such that it is present at least partly on the surface. If the fixed susceptor (RS) consists of the catalytic material (KM), the catalytic material (KM) simultaneously acts as susceptor.

For example, the fixed susceptor (RS) may have been coated with the catalytic material (KM) or the catalytic material (KM) may have been embedded into the fixed susceptor (RS). In the latter case, the catalytic material (KM) may not be present exclusively at the surface, even though this is desirable. This is the reason for the wording "is present at least partly at the surface".

Suitable catalytic materials (KM) are, for example, Cr, V, Zn, Co, Mo, W, Ni, Al, Cu, iron, $Fe_2O_3$ or alloys of Cu, Zn, Cr, Ni, Mo, or iron, for example steels such as stainless steel, Cr—Ni steel, CrNiMo steel. Preferred catalytic materials (KM) are, for example, iron, $Fe_2O_3$, $(CoMoAl)_xO_y$, or alloys of iron, for example steels, such as stainless steel, Cr—Ni steel, CrNiMo steel.

The catalytic material (KM) and the active susceptor (AS) may be identical or different. For example, Al, Cu, Zn, iron or alloys of Cu, Zn or iron, for example steels, such as stainless steel, Cr—Ni steel, Cr—Ni—Mo steel, may simultaneously be used as active susceptor (AS) and as catalytic material (KM).

"Identical" means here that the catalytic material (KM) functions as active susceptor (AS), but the susceptor (S) may also contain further materials that can couple to the inductive field (IF).

Examples of fixed susceptors (RS) into which catalytic material (KM) has been embedded are metal particles incorporated in matrices, for example polymer or ceramic matrices into which metal particles are incorporated.

The fixed susceptor (RS) may also be formed from porous metallurgical waste materials, for example red mud provided with metal particles.

These metal particles typically act as catalytic material (KM) and active susceptor (AS) at the same time.

The fixed susceptor (RS) may alternatively be a cylinder or a honeycomb structure which is equipped with an active susceptor (AS), for example metal wool, especially steel wool. In this variant, the cylinder or honeycomb structure normally consists of material that does not couple inductively, for example silicon carbide.

The fixed susceptor (RS) may alternatively be a perforated plate or a stack of perforated plates. This perforated plate/these perforated plates may comprise or consist of a catalytic material (KM). The perforated plates may also function as carrier for a catalyst bed, especially $Fe_2O_3$, $(CoMoAl)_xO_y$, Cr, V, Zn, Co, Mo, W, Ni.

The fixed susceptor (RS) may alternatively be a mesh, for example fiber mesh, coated with catalytic material (KM). These are typically shaped to rolls with fiber mats. The catalytic material (KM) here simultaneously acts as active susceptor (AS).

The coating with catalytic material (KM) can be effected, for example, by means of thermal spraying, dip-coating methods or electrochemical coating (electroplating). This makes it possible to produce, for example, a rough and porous layer.

Preferably, the catalytic material has a low roughness of 30 to 200 μm.

BRIEF DESCRIPTION OF THE SEVERAL VIEWS OF THE DRAWING(S)

FIGS. 1-4 illustrate different embodiments of the invention.

Figure 5A:
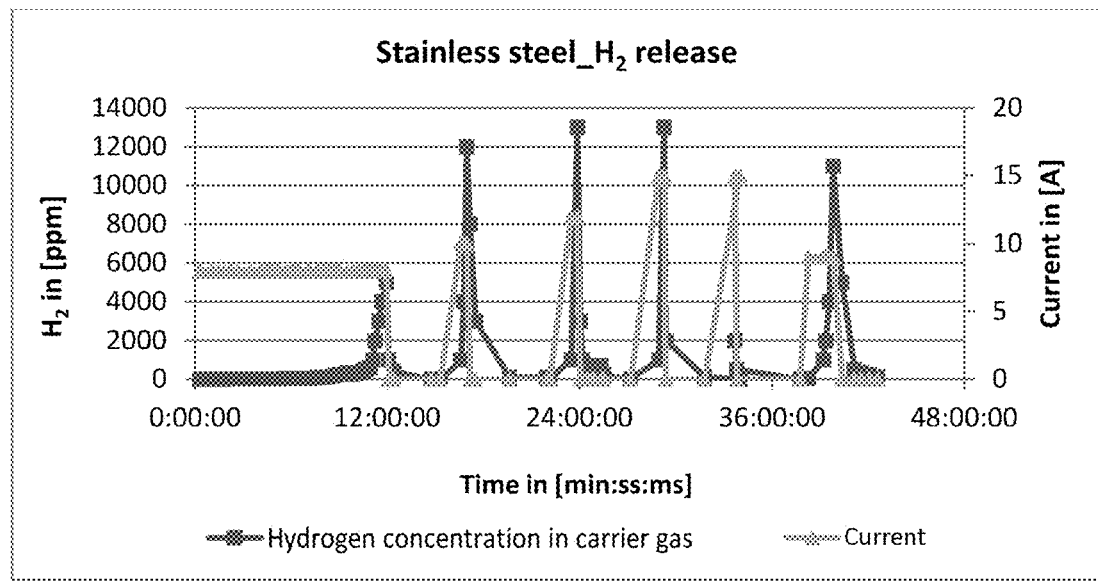
Figure 5B:
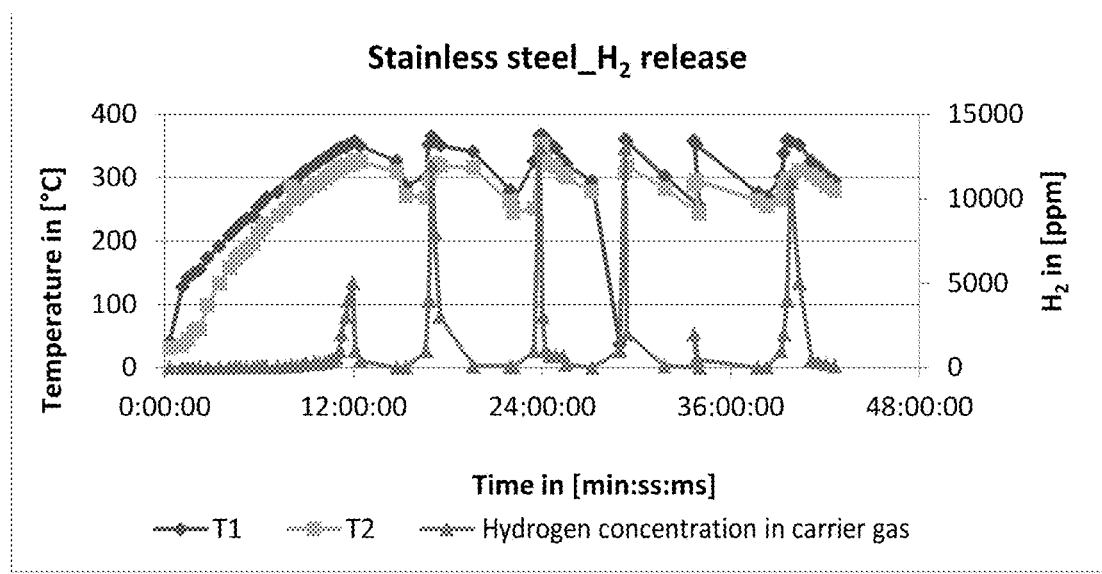
Figure 6A:
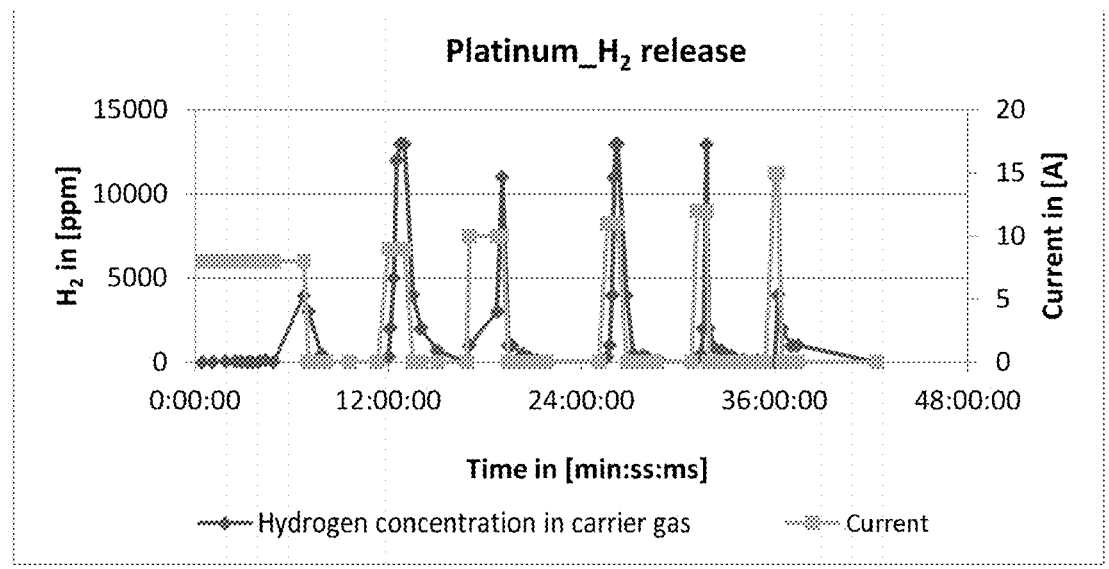
Figure 6B:
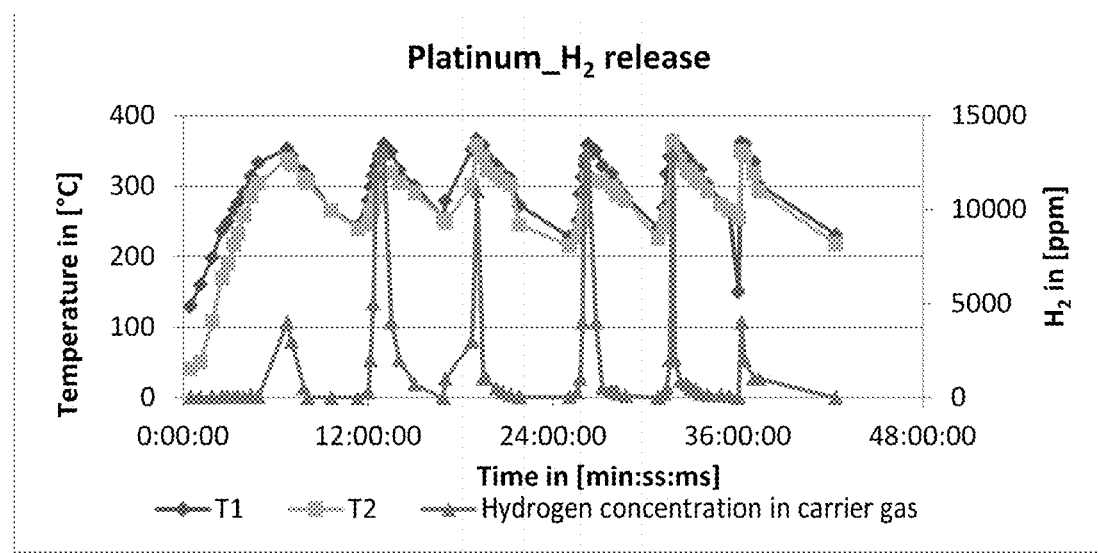
Figure 7A:
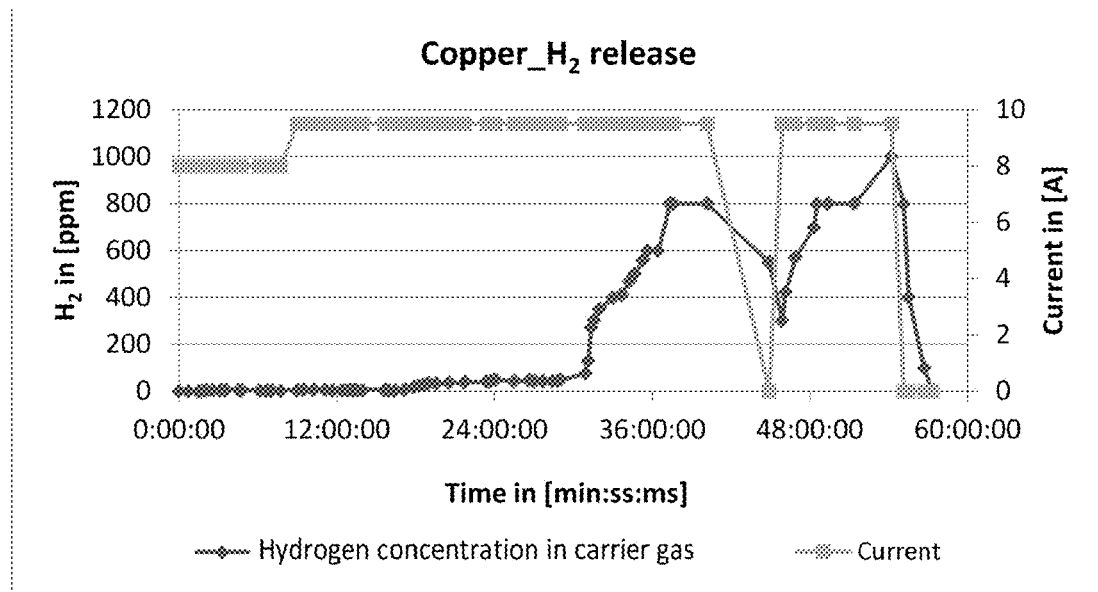
Figure 7B:
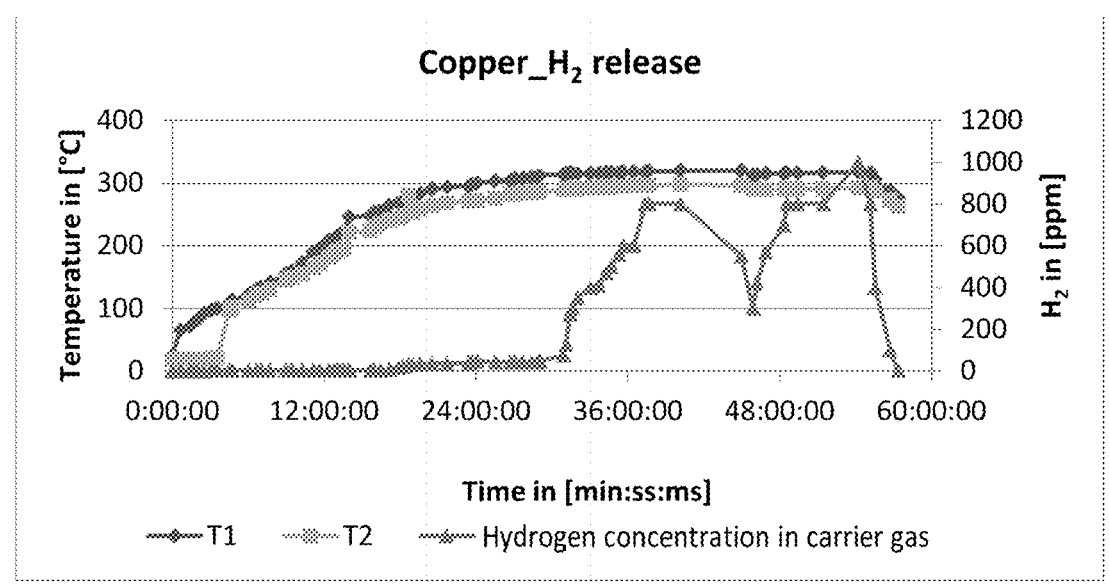
Figure 8A:
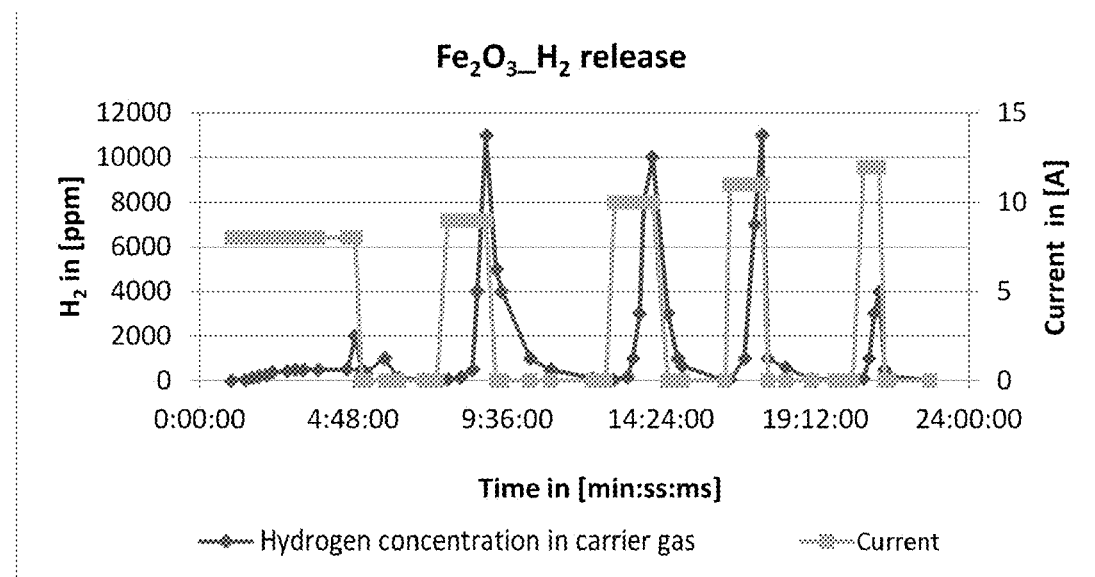
Figure 8B:
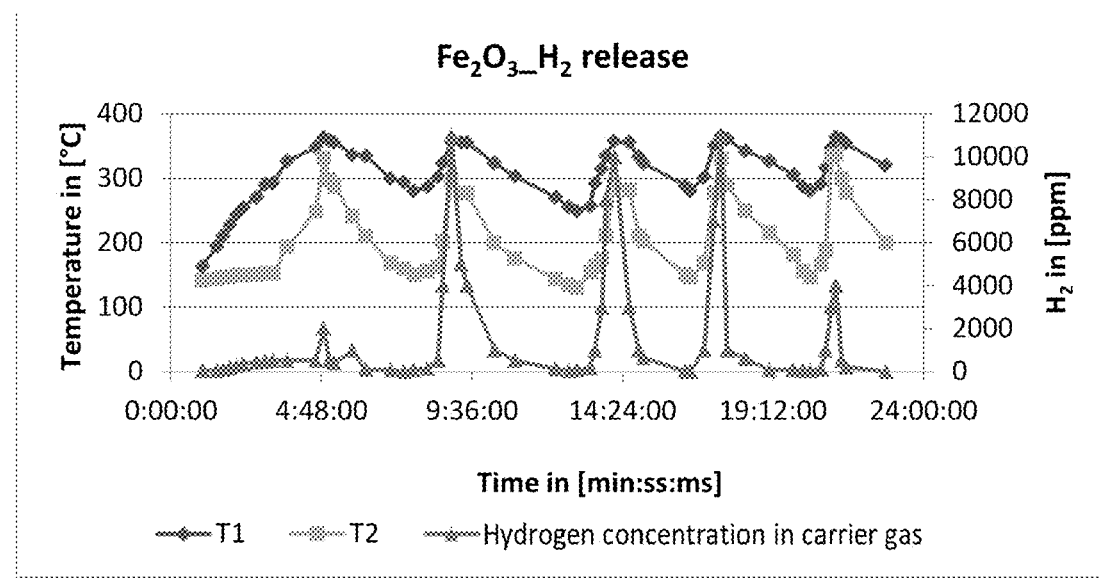

FIGS. 5 to 8 show the current progressions (FIGS. 5(a), 6(a), 7(a), and 8(a)) and temperature progressions (FIGS. 5(b), 6(b), 7(b), and 8(b)) for stainless steel balls (FIGS. 5(a-b)), stainless steel balls provided with a platinum layer (FIGS. 6(a-b)), hollow copper spheres (FIGS. 7(a-b)), and $Fe_2O_3$ pellets (FIGS. 8(a-b)) as $H_2$ is released, with the evolution of the thermocouple temperatures being identified as T1 and T2, whereby T1 was measured directly at the surface of the susceptor (S) and T2 in the liquid. The temperature T1 is regarded as the temperature of the organic molecules (OM).

DETAILED DESCRIPTION OF THE INVENTION

FIG. 1 shows a reaction vessel (2) made of quartz glass with an induction coil (1). The silicon carbide tubes (3) have been filled with steel wool (4) and combined to form a tube bundle (5). The steel wool (4) acts as a susceptor (S) and is typically coated with catalytic material (KM). There are stainless steel flanges at the upper and lower ends of the reaction vessel (not shown in the figure).

Figure 2:
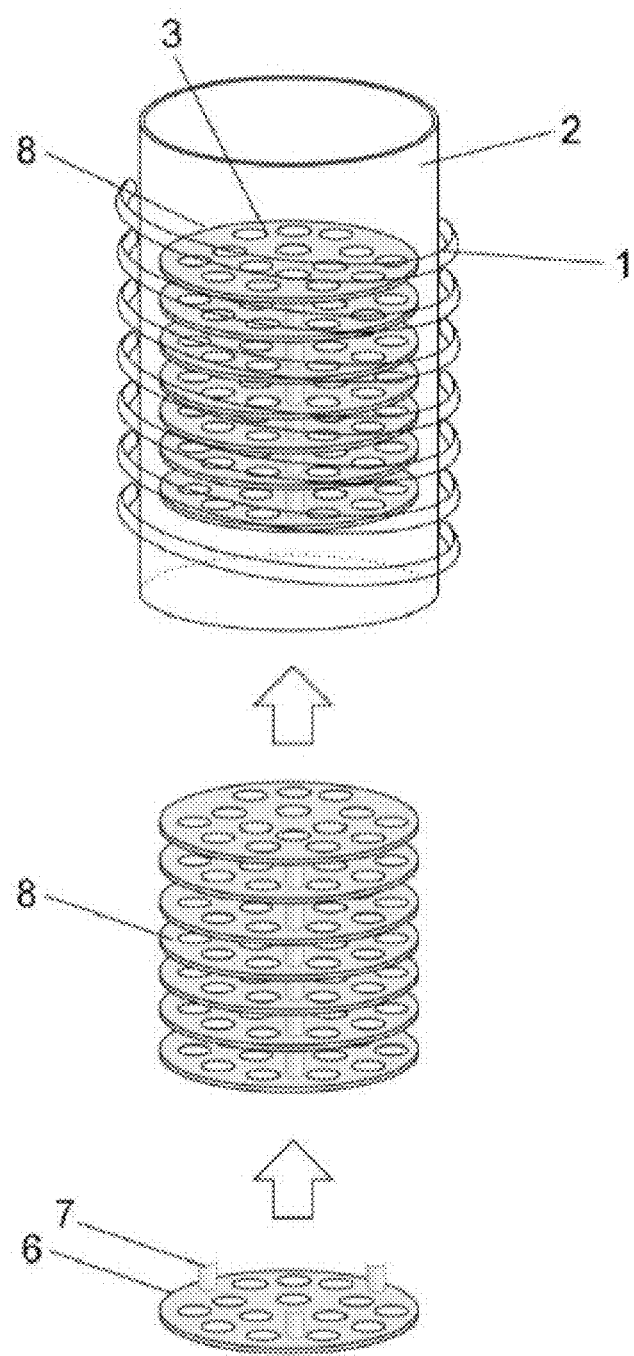

FIG. 2 likewise shows a reaction vessel (2) made of quartz glass with an induction coil (1) as in FIG. 1. However, the reaction vessel contains a stack of perforated plates (8), formed from perforated plates (6) and appropriate spacers (7). The perforated plates may have been coated with catalytic material (KM) or may be used as support for a bed of catalytically active material. There are stainless steel flanges at the upper and lower ends of the reaction vessel (not shown in the figure).

Figure 3:
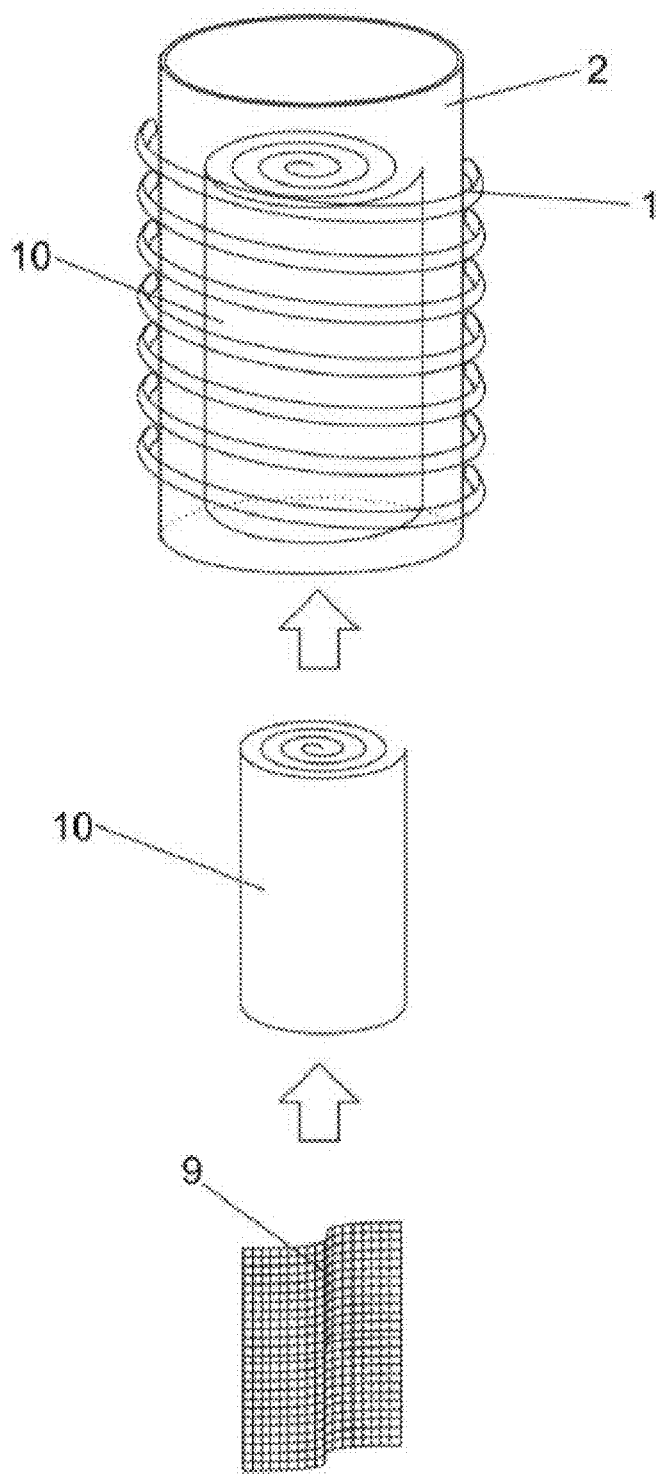

FIG. 3 likewise shows a reaction vessel (2) with an induction coil (1) as in FIGS. 1 and 2. A fiber mesh (9) that has typically been coated with catalytic material (KM) and acts as susceptor (S) is shaped to a roll by means of a fiber material (10) and introduced into the reaction vessel (2). There are stainless steel flanges at the upper and lower ends of the reaction vessel (not shown in the figure).

Figure 4:
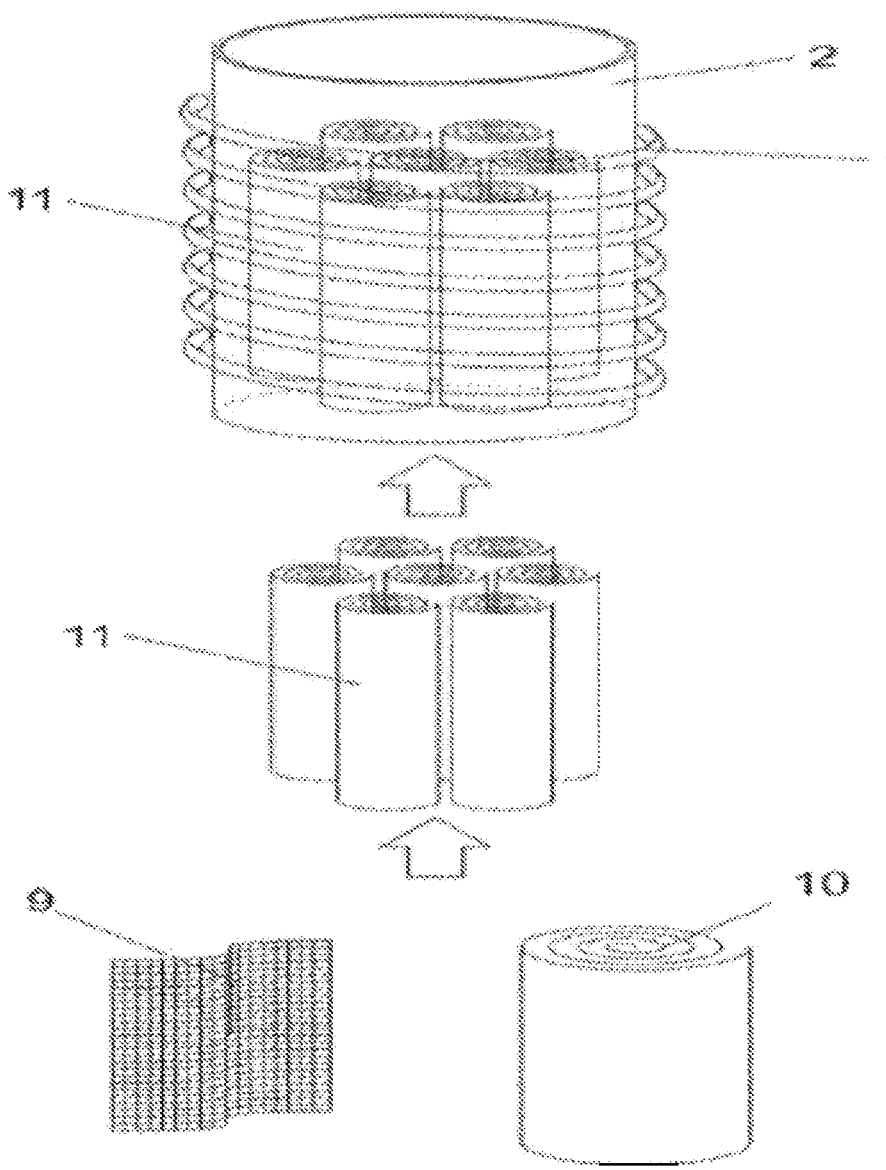

FIG. 4 shows one variant of the embodiment of FIG. 3 in which multiple rolls (10) and multiple fiber meshes (9) are shaped to a bundle (11) and introduced into the reaction vessel (2). There are stainless steel flanges at the upper and lower ends of the reaction vessel (not shown in the figure).

There follows a description of preferred embodiments of the solid loose material (FLM).

The solid loose material (FLM) preferably consists of the catalytic material (KM) or has an outer layer (Sch) comprising or consisting of a catalytic material (KM). The catalytic material (KM) and the active susceptor (AS) may be identical or different; they are preferably identical. As set out above, "identical" here means that the catalytic material (KM) functions as active susceptor (AS), but the susceptor (S) may also comprise further materials that can couple to the inductive field (IF).

The elements of the solid loose material (FLM) preferably each have a volume of 0.040 $cm^3$ to 120 $cm^3$, preferably 0.040 $cm^3$ to 33.50 $cm^3$, more preferably 0.040 $cm^3$ to 16.75 $cm^3$. For example, the solid loose material is roll-shaped, dumbbell-shaped, egg-shaped or sphere-shaped.

In a particular embodiment, the solid loose material (FLM) is spherical, the elements of the solid loose material (FLM) preferably having a diameter of 0.25 cm to 6.0 cm, preferably 0.25 cm to 5.0 cm.

Preferably, the elements of the solid loose material (FLM) have an outer layer (AS), which outer layer (AS) comprises or consists of a catalytic material (KM), and the elements of the solid loose material (FLM) have an inner core (IK) comprising or consisting of at least one phase change material (PCM).

In one variant of the present invention, the solid loose material (FLM) does not comprise a phase change material; solid loose material (FLM) preferably consists of the catalytic material (KM). In this variant, the elements of the solid loose material (FLM) preferably each have a volume of 0.040 $cm^3$ to 16.75 $cm^3$, more preferably a volume of 0.040 $cm^3$ to 10.00 $cm^3$. In a particularly preferred variant of this variant, the solid loose material (FLM) is spherical, the elements of the solid loose material (FLM) preferably having a diameter of 0.25 cm to 2.0 cm, preferably 0.25 cm to 1.0 cm.

In an alternative variant of the present invention, the solid loose material (FLM) comprises phase change material. In this variant, the elements of the solid loose material (FLM) preferably each have a volume of 0.040 $cm^3$ to 120 $cm^3$, preferably 4.0 $cm^3$ to 60 $cm^3$, even more preferably 10.00 $cm^3$ to 33.50 $cm^3$. In a particularly preferred variant of this variant, the solid loose material (FLM) is spherical, the elements of the solid loose material (FLM) preferably having a diameter of 1.0 cm to 6.0 cm, preferably 1.5 cm to 4.5 cm.

Preferably, the inner core has an electrically conductive internal structure. This permits direct heating of the phase change material by the inductive field. This electrically conductive internal structure may comprise or consist of at least one sponge and/or a grid and/or particles, each of which has been manufactured from a metal or an alloy.

Depending on the application, the phase change material (PCM) present in the inner core should preferably have a phase change temperature of not more than about 450° C., more preferably not more than about 400° C., even more preferably not more than about 375° C. and most preferably not more than about 350° C.

The phase change material (PCM) preferably has a phase change temperature of at least about 200° C., more preferably at least about 250° C.

Especially preferred are phase change materials having a phase change temperature between about 200° C. and about 375° C., more preferably between about 250° C. and about 350° C.

A phase change material having such a phase change temperature can assure a release of heat that ensures an optimal reaction temperature at the surface. In this way, release of heat takes place solely at the surface of the solid loose material (FLM), which ensures an optimal environment for the running of the catalyzed reaction at this surface. Moreover, there is no unnecessary heating of the liquid reactant that is not close to the catalyst supports.

The phase change material may of course, according to the optimal reaction temperature and catalyst used, be selected with regard to an appropriate phase change temperature. The most suitable phase change materials here are those having melting temperatures $T_m$ and solidification temperatures $T_f$ within the temperature range required.

In one variant of the present invention, the phase change material is an inorganic salt or a combination of multiple inorganic salts. Possible salts or combination of salts for use as phase change material in the context of the present invention are LiNC ($T_m$=254° C.), $NaNO_2$ ($T_m$=282° C.), $NaNO_3$+NaCl ($T_m$=282° C.), $KNO_3$+$NaNO_3$ ($T_m$=290° C.), $NaNO_3$ ($T_m$=310° C.), NaOH ($T_m$=318° C.), $KNO_3$ ($T_m$=337° C.), $MgCl_2$+NaCl+KCl ($T_m$=385° C.), NaOH+$NaNO_3$ ($T_m$=257° C.), $NaNO_3$+NaOH ($T_m$=270° C.), $Li_2CO_3$+$K_2CO_3$+$Na_2CO_3$ ($T_m$=397° C.), $NaNO_3$+NaCl+

Na$_2$SO$_4$ (T$_m$=287° C.), LiCl+Ca(NO$_3$)$_2$ (T$_m$=270° C.), Li$_2$CO$_3$+K$_2$CO$_3$+Na$_2$CO$_3$ (T$_m$=397° C.), LiCl+KCl (T$_m$=348° C.), RbNO$_3$ (T$_m$=310° C.), ZnCl$_2$ (T$_m$=290° C.), KClO$_4$ (T$_m$=304° C.), KOH (T$_m$=360° C.), LiOH+LiCl+KCl (T$_m$=282° C.), NaOH+NaCl+Na$_2$CO$_3$ (T$_m$=318° C.), LiOH+LiCl (T$_m$=264° C.), NaNO$_2$+NaOH (T$_m$=237° C.), KCl+MnCl$_2$+NaCl (T$_m$=400° C.), NaF+NaNO$_3$+NaCl (T$_m$=288° C.),

In another variant, metallic phase change materials are used, the most suitable being eutectic systems having melting temperatures T$_m$ and solidification temperatures T$_f$ within the temperature range required. Possible systems are cadmium (T$_m$=321° C.), lead (T$_m$=328° C.), Mg—Zn (T$_m$=340° C.), Zn—Al (T$_m$=380° C.), Mg—Ca—Zn (T$_m$=400° C.).

Hollow beads typically comprising or consisting of the catalytic material (KM) suitable for filling with phase change material may be producible via sheet forming (pressing, forging, etc.) or by coating of styrofoam beads with powder slurry and subsequent firing and sintering. In the production of the catalyst support, the phase change materials may be introduced into drilled spheres as a molten alloy, powder or granules. After the filling, the beads may be welded in an automatable process.

Alternatively, beads may be formed from the phase change material, which are encased by means of thermal spraying with the catalytic material (KM) in thicknesses of 50 μm to 5 mm. The phase change material beads can be produced in various ways, for example by casting in molds, pressing of moldings (precursors in the form of wire or rod sections) or forging of moldings.

There follows a description of preferred variants of all embodiments of the invention, unless explicitly stated otherwise.

The susceptor (S), especially if the susceptor (S) is a fixed susceptor (RS) comprising or consisting of a catalytic material (KM) and/or the susceptor (S) is a fixed solid material (FLM) consisting of the catalytic material (KM) or having an outer layer (AS) comprising or consisting of a catalytic material (KM), is characterized in that the susceptor (S) preferably has a roughness of 30 to 200 μm.

As set out above, the process of the invention is especially suitable for dehydrogenation of liquid organic hydrogen carriers (LOHCs).

Preferably, the process of the present invention is consequently a process for dehydrogenating liquid organic hydrogen carriers (LOHCs). In this process, the organic molecules (OM) are consequently LOHCs.

The dehydrogenated organic molecules (DOM) are the reaction product of the organic molecules (OM) after dehydrogenation thereof by the process of the present invention.

The inductive field (IF) preferably has a frequency of 50 to 600 kHz, more preferably a frequency of 75 to 550 kHz, even more preferably a frequency of 100 to 450 kHz and most preferably a frequency of 150 to 300 kHz.

The inductive field (IF) preferably has a current of 4.0 to 20 amperes, more preferably 6.0 to 16 amperes.

Preferably, the process is conducted continuously and the average dwell time of the organic molecules (OM) in step b) is 1.0 to 16 min/g LOHC. This is based on the weight of the LOHCs without any solvents present.

Typically, the organic molecules (OM) are liquid and/or dissolved in a solvent. Suitable solvents are known in the prior art, for example hydrocarbons.

Typically, the temperature of the organic molecules (OM) within the reaction vessel in step b) is not more than 400° C.; the temperature of the organic molecules (OM) within the reaction vessel during and between steps a) to d) is preferably not more than 400° C.

In one variant A, the invention is further directed to a reaction vessel (RB) which
i) has been provided with a device for producing an inductive field (IF); and
ii) comprises a solid loose material (FLM),
wherein the solid loose material (FLM)
is such that it can couple magnetically to the inductive field (IF) and
consists of a metal (M) or metal alloy (ML) which can couple magnetically to the inductive field (IF) or has an outer layer (Sch) comprising or consisting of a metal (M) or metal alloy (ML),
and
the reaction vessel is such the solid loose material (FLM) can couple to the inductive field (IF) and
the reaction vessel has an inlet for supply of organic molecules (OM), and the reaction vessel is configured such that the solid loose material (FLM) comes into contact with the organic molecules (OM) after they have been supplied.

In variant A, the invention is further directed to a process for dehydrogenating organic molecules (OM), having the following steps
a) supplying the organic molecules (OM) to a reaction vessel (RB),
wherein the reaction vessel
i) has been provided with a device for producing an inductive field (IF); and
ii) comprises a solid loose material (FLM),
b) applying an inductive field (IF) and allowing the inductive field (IF) to act on the solid loose material (FLM) and the organic molecules (OM),
c) removing the hydrogen from the reaction vessel (RB) during and/or after step b),
d) removing the dehydrogenated organic molecules (DOM) from the reaction vessel (RB) during and/or after step b), for example during step c),
wherein the solid loose material (FLM)
is such that it can couple magnetically to the inductive field (IF) and
consists of a metal (M) or metal alloy (ML) which can couple magnetically to the inductive field (IF) or has an outer layer (Sch) comprising or consisting of a metal (M) or metal alloy (ML),
and
the reaction vessel is such that the solid loose material (FLM) can couple to the inductive field (IF) and the solid loose material (FLM) comes into contact with the organic molecules (OM).

The metal (M) or metal alloy (ML) in variant A may be, for example, Cu, Fe, Pd, Co, Mo, Al, Cr, Zn, Pt or alloys thereof, for example steels, such as stainless steel, Cr—Ni steel, Cr—Ni—Mo steel.

The solid loose material (FLM) preferably has an outer layer (Sch) consisting of a metal (M) or metal alloy (ML).

In a preferred variant, however, the solid loose material (FLM) is free of platinum, palladium, rhodium, gold, iridium, titanium, tantalum and ruthenium; more preferably, the reaction vessel and its contents are free of platinum, palladium, rhodium, gold, iridium, titanium, tantalum and ruthenium.

Preferred features of the process of the present invention are also preferred features of the reaction vessel and of the process of variant A according to the present invention.

The invention is also directed to the use of solid loose material (FLM) which
is such that it can couple magnetically to an inductive field (IF) and
consists of a metal (M) or metal alloy (ML) which can couple magnetically to the inductive field (IF) or has an outer layer (Sch) comprising or consisting of a metal (M) or metal alloy (ML),
the elements of the solid loose material (FLM) each have a volume of 0.040 $cm^3$ to 16.75 $cm^3$;
for dehydrogenation of organic molecules (OM).

The metal (M) or metal alloy (ML) in variant A may be, for example, Cu, Fe, Pd, Co, Mo, Al, Cr, Zn, Pt or alloys thereof, for example steels, such as stainless steel, Cr—Ni steel, Cr—Ni—Mo steel.

The solid loose material (FLM) preferably has an outer layer (Sch) consisting of a metal (M) or metal alloy (ML).

In a preferred variant, however, the solid loose material (FLM) is free of platinum, palladium, rhodium, gold, iridium, titanium, tantalum and ruthenium.

Preferred features of the process according to the present invention, the reaction vessel and the process of variant A according to the present invention are also preferred features of the use of the present invention.

EXPERIMENTAL

Test Methods:

Roughness was determined to DIN EN ISO 4287.

For this purpose, the roughness measurement system from Hommelwerke was used, which gave the maximum roughness profile height.

Temperature of the organic molecules (OM) within the reaction vessel was determined by means of thermocouples that have been positioned in the reactor such that they ascertained the temperature at the direct sphere surface and in the liquid. The thermocouple for the liquid here was 0.5 to 1.5 mm away from the sphere surface. The evolution of the thermocouple temperatures is identified as T1 and T2 in FIGS. 5 to 8. T1 was measured directly at the surface of the susceptor (S), T2 in the liquid. The temperature T1 is regarded as the temperature of the organic molecules (OM).

Amount of Hydrogen

The amount of hydrogen released was determined with the aid of a Testo 316-EX gas leak tester. The measuring instrument was calibrated to the chemical element hydrogen and gives the proportion thereof in ppm or % by volume. The gas concentrations are measured by the semiconductor sensor in the ppm range and displayed with a resolution of 1 ppm in the display. The hydrogen content released was measured here in an N stream. The hydrogen/nitrogen mixture was passed through a tube in which the sensor of the measuring instrument was present. It was then possible, with the aid of the measuring instrument, to ascertain the proportion of hydrogen released in ppm as a function of the nitrogen present. By means of the prior determination of a correction curve by means of a hydrogen flowmeter, it was possible to establish a measurement accuracy of $R^2$=0.9.

Example 1

Stainless steel balls with NaOH as PCM material having an approximate diameter of 4 cm were produced as follows. Two hollow half-spheres in each case were joined by means of a weld seam. In order to introduce the PCM into the hollow spheres, a hole of 5 to 10 mm was drilled. Through the hole, the PCM, in an amount of 25-30 g, was introduced in powder form. Subsequently, the spheres were closed again by means of a weld seam. The sphere production was followed by the processing and structuring of the ball surface by means of sandblasting methods. FIG. 1 shows the ball structure. With the aid of the sandblasting method, it was possible to conduct F12 structuring that produced a maximum roughness of 100.5 µm on the surface of the ball.

The balls were introduced into a reaction vessel that was constructed in-house. The reactor consists of a quartz glass tube mounted on a flat stainless steel flange. The reactor has a volume of 455 $cm^3$. The blank flange has four holes, two holes having been provided with thermocouples, one hole for the feed of material or for nitrogen purging and one hole for the discharge of hydrogen.

The reactor was supplied with LOHC material (dibenzyltoluene) via a pipe feed. The hydrogen formed was withdrawn and sent to the hydrogen determination at a constant nitrogen flow rate of 0.8 L/h as carrier gas. Connected upstream of the hydrogen determination was a condensate trap in order to capture potentially evaporated LOHC.

A high-frequency magnetic field was switched on until attainment of the respective maximum temperature of about 350° C. and switched off on attainment. The induced voltage is 400 V. The frequency varied here between 150 and 300 kHz. The current progressions in FIG. 5a show the switch-on and switch-off phases. The $H_2$ concentration as a measure of the release declined significantly immediately after the switch-off as apparent from FIG. 5a, whereas the temperature drop was much slower, as apparent from FIG. 5b. Thus, it is not possible that the sole factor affecting the release of $H_2$ is the temperature. The magnetic field consequently leads to activation of the catalyst material.

Example 2

The stainless steel balls obtained in example 1 were provided with a platinum layer of about 1 to 5 µm by electrochemical means and the release of hydrogen was determined as in example 1. The respective progressions are shown in FIGS. 6a and 6b.

Example 3

Hollow copper spheres having an approximate diameter of 4 cm were produced as follows. This involved welding two separate hollow spheres by means of a weld seam and then roughening them by sandblasting.

The spheres had a roughness of 100 µm. The release of hydrogen was determined as in example 1. The respective progressions are shown in FIGS. 7a and 7b.

As expected, the copper spheres, owing to their poorer coupling to the inductive field, showed lower evolution of $H_2$.

Example 4

The reaction vessel was equipped with a stainless steel sieve as susceptor.

$Fe_2O_3$ pellets having a volume of 0.65 $cm^3$ to 5.25 $cm^3$ were placed on the stainless steel sieve as a bed. The release of hydrogen was determined as in example 1. The respective progressions are shown in FIGS. 8a and 8b.

The invention claimed is:

1. A process for dehydrogenating organic molecules (OM), having the following steps:
   a) feeding the organic molecules (OM) into a reaction vessel (RB), where the reaction vessel
  i) has been provided with a device for generating an inductive field (IF); and
  ii) has a susceptor (S) for the inductive field (IF),
b) applying an inductive field (IF) and allowing the inductive field (IF) to act on the susceptor (S) and the organic molecules (OM),
c) removing hydrogen from the reaction vessel (RB) during and/or after step b),
d) removing dehydrogenated organic molecules (DOM) from the reaction vessel (RB) during and/or after step b),
wherein the susceptor (S) comprises an active susceptor (AS),
the active susceptor (AS) is such that it can couple magnetically to the inductive field (IF), and
the reaction vessel is such that
the active susceptor (AS) can couple to the inductive field (IF),
the susceptor (S) comes into contact with the organic molecules (OM), and
the reaction vessel and its contents are free of platinum, palladium, rhodium, gold, iridium, titanium, tantalum and ruthenium.

2. The process of claim 1, wherein the susceptor (S) is a solid loose material (FLM) or a fixed susceptor (RS).

3. The process of claim 2, wherein the fixed susceptor (RS) comprises a catalytic material (KM), or the fixed susceptor (RS) takes the form of a carrier for the catalyst material (KM).

4. The process of claim 2, wherein the solid loose material (FLM) consists of the catalytic material (KM) or has an outer layer (Sch) comprising a catalytic material (KM).

5. The process of claim 4, wherein the elements of the solid loose material (FLM) each have a volume of 0.040 cm$^3$ to 16.75 cm$^3$.

6. The process of claim 4, wherein the elements of the solid loose material (FLM) have an outer layer (Sch) comprising a catalyst material (KM) and having an inner core (IK) comprising at least one phase change material (PCM).

7. The process of claim 3, wherein the catalytic material (KM) is Cr, V, Zn, Co, Mo, W, Ni, Al, Cu, iron, $Fe_2O_3$, $(CoMoAl)_xO_y$, or alloys of Cu, Zn, Cr, Ni, Mo, or iron.

8. The process of claim 3, wherein the susceptor (S) is a fixed susceptor (RS) comprising a catalytic material (KM) and/or the susceptor (S) is a solid loose material (FLM) consisting of the catalytic material (KM) or has an outer layer (AS) comprising a catalytic material (KM), wherein the susceptor (S) has a roughness of 30 to 200 μm.

9. The process of claim 1, wherein the inductive field (IF) has a frequency of 50 to 600 kHz and/or a current of 4.0 to 20 amperes.

10. The process of claim 1, wherein the process is conducted continuously and the average dwell time of the organic molecules (OM) in step b) is 1.0 to 16 min/g LOHC.

11. The process of claim 1, wherein the organic molecules (OM) are liquid and/or have been dissolved in a solvent.

12. The process of claim 1, wherein the maximum temperature of the organic molecules (OM) within the reaction vessel (RB) is not higher than 400° C.

13. A reaction vessel (RB) which:
  i) has been provided with a device for generating an inductive field (IF); and
  ii) comprises a solid loose material (FLM),
  wherein the solid loose material (FLM)
  is such that it can couple magnetically to the inductive field (IF) and
  consists of a metal (M) or metal alloy (ML) which can couple magnetically to the inductive field (IF) or has an outer layer (Sch) comprising or consisting of a metal (M) or metal alloy (ML), and
  the reaction vessel is such that the solid loose material (FLM) can couple to the inductive field (IF), and
  the reaction vessel has an inlet for supply of organic molecules (OM),
  the reaction vessel is configured such that the solid loose material (FLM) comes into contact with the organic molecules (OM) after they have been supplied; and
  wherein the reaction vessel and its contents are free of platinum, palladium, rhodium, gold, iridium, titanium, tantalum, and ruthenium.

14. A process for dehydrogenating organic molecules (OM), comprising the following steps:
  a) feeding the organic molecules (OM) into a reaction vessel (RB),
  wherein the reaction vessel;
    i) has been provided with a device for producing an inductive field (IF); and
    ii) comprises a solid loose material (FLM),
  b) applying an inductive field (IF) and allowing the inductive field (IF) to act on the solid loose material (FLM) and the organic molecules (OM),
  c) removing hydrogen from the reaction vessel (RB) during and/or after step b),
  d) removing dehydrogenated organic molecules (DOM) from the reaction vessel (RB) during and/or after step b),
  wherein the solid loose material (FLM)
  is such that it can couple magnetically to the inductive field (IF), and
  consists of a metal (M) or metal alloy (ML) which can couple magnetically to the inductive field (IF) or has an outer layer (Sch) comprising a metal (M) or metal alloy (ML), and
  the reaction vessel is such that the solid loose material (FLM) can couple to the inductive field (IF) and the solid loose material (FLM) comes into contact with the organic molecules (OM).

* * * * *